United States Patent Office 3,677,918
Patented July 18, 1972

3,677,918
METHOD FOR DIRECTLY ELECTROCHEMICALLY EXTRACTING GALLIUM FROM A CIRCULATING ALUMINATE SOLUTION IN THE BAYER PROCESS BY ELIMINATING IMPURITIES
Shigenobu Miyake, Tokyo, Japan, assignor to Chuo Tatemono Co., Ltd., Tokyo, Japan
No Drawing. Filed Sept. 18, 1969, Ser. No. 859,202
Claims priority, application Japan, Oct. 21, 1968, 43/76,661; Jan. 21, 1969, 44/4,313
Int. Cl. C22d 1/00
U.S. Cl. 204—105 R    7 Claims

ABSTRACT OF THE DISCLOSURE

Gallium is electrochemically recovered from a circulating aluminate solution in the Bayer process for producing alumina directly without any precipitate formation, filtration and redissolution for the purpose of changing the concentration of major component. Gallium is electro-deposited at cathode surface when the solution is used as an electrolyte.

This invention relates to a method for extracting gallium, and more particularly to a method for electro-chemically directly extracting gallium from a circulating aluminate solution in the Bayer process for producing alumina by eliminating obstacles from the solution.

Gallium is one of rarer metallic elements and the amount of gallium contained in the earth crust is 15 g. per ton of the earth crust. A very small amount of gallium is almost always contained in aluminum ore, zinc ore, etc., but it is very rare that gallium exists in a concentrated state. That is, there are no ores containing gallium as a major component in nature almost at all. Thus, according to the conventional method, gallium is produced by recovering only gallium, which is contained in the ores in a very diluted state such as one-millionth or less of the weight of the ore, from the waste portions containing a relatively large amount of gallium obtained when aluminum or zinc is produced from its ore, by a large number of means and repetition of complicated chemical procedures, that is, by removing a large amount of principal component, i.e. aluminum or zinc at first, and successively eliminating a relatively large amount of impurities from the ore. However, aluminum and zinc belong respectively to the same group and same period as gallium in the Periodic Table and as such have chemical properties similar to those of gallium. Accordingly, it is very difficult to separate a very small amount of impure gallium from a large amount of such principal component having chemical properties similar to those of gallium.

However, the present inventor has found that the most remarkable difference in properties between aluminum and gallium is that aluminum is incapable of undergoing electrodeposition in an aqueous solution, whereas gallium is capable of undergoing electrodeposition. Further, the present inventor has found that, even if there is aluminum when the electrodeposition of gallium is carried out, such presence of aluminum offers no hinderance to the electrodeposition of gallium and even if a very small amount of gallium is present in aluminum solution, it is possible to simply separate gallium by using such electrodeposition process.

The solution containing gallium and a large amount of aluminum is a circulating aluminate solution in the Bayer process for producing alumina.

According to the present invention, a large amount of gallium can be recovered in an advantageous manner, from the bauxite ore, while the amount of bauxite ores to be treated is now increasing with increased production of aluminum.

The present invention is to provide a method for recovering gallium characterized by electrochemically extracting gallium from the circulating aluminate solution simply by eliminating obstacles for the deposition of gallium, without any addition of such operations as precipitate formation, filtration and resolution for the purpose of changing the concentrations of major component aluminum, sodium and the desired gallium to be recovered in the circulating aluminate solution, that is, without any hinderance to the process for producing alumina.

The components of the bauxite ores are, on an average, 50% of $Al_2O_3$, 30% of $H_2O$, 13% of $Fe_2O_3$, 5% of $SiO_2$, 1.0% of $TiO_2$ and 1.0% of $$V_2O_5 + Ga_2O_3 + CaO + P_2O_5 + \ldots$$

About 0.002% of gallium is contained in the bauxite ore on an average.

The first step for aluminum extraction by using the bauxite ores as a raw material is to produce alumina from the ores. In this step, "the Bayer process" is employed in almost all the world. That is, a caustic soda solution is added to pulverized bauxite at first, and the mixture is heated under pressure in an autoclave. Then, the aluminum in the ores reacts with caustic soda to form sodium aluminate and is dissolved in the solution, whereas Fe, Si, Ti, etc. undergo no dissolution and settle down as precipitate. The precipitate is removed by filtration as a "red mud." Then, the filtrate, a solution of sodium aluminate, is led to a decomposing tank and cooled, whereby sodium aluminate is hydrolyzed to form aluminum hydroxide $Al(OH)_3$ and the aluminum hydroxide settles down as precipitate. The aluminum hydroxide is collected by filtration and calcined in a rotary kiln, whereby alumina $Al_2O_3$ is obtained. In the solution from which $Al(OH)_3$ has been filtered off, a large amount of sodium aluminate remains yet, and caustic soda also remains in a concentrated state. Thus, the solution is returned to the initial step of the process for producing alumina and utilized through circulation. That is, said circulating solution is generally called "a circulating aluminate solution."

The behavior of the desired gallium to be recovered in the circulating aluminate solution seems to be that the gallium in the ores is almost all dissolved into a caustic soda solution at the extraction of aluminum with the caustic soda solution in the first step of the process for producing alumina and enters into the circulating aluminate solution, and thus the gallium in the freshly charged ores is added to the solution while the solution is recycled, and is gradually accumulated. However in practice, the gallium is partly carried away with red mud and the deposited $Al(OH)_3$ through the adhesion or entrainment, and the amount of gallium to be carried away in such a manner is increased with increased concentration of gallium in the solution, and finally the added gallium and the carried-away gallium reach an equilibrium state. That is, the gallium in the circulating aluminate solution never exceeds a definite critical amount. For example, when it is assumed that 2000 ton of bauxite ores is dissolved in 7000 ton of an alkaline solution at the start of the process for producing alumina and the gallium content in the ores is 0.002%, the concentration of gallium in the solution at the start is calculated to be only about 5.7 p.p.m. The gallium is accumulated by repeated recycle of the circulating aluminate solution and reaches about 60 to 170 p.p.m. When the gallium reaches such a stationary state, the composition of the circulating aluminate solution after the precipitation of $Al(OH)_3$ is given below:

The principal components Na and Al are 130 to 200 g./l. as NaOH and 65 to 130 g./l. as $Al(OH)_3$ respectively, and other impurities are 17.0 g./l. of $Na_2CO_3$, 0.3 g./l. of $SiO_2$, 0.5 g./l. of Cl, 0.15 g./l. of $SO_3$, 0.8 g./l.

of $P_2O_5$, 0.5 g./l. of $V_2O_5$ and a trace of $As_2O_3$ and $MoO_3$. $Ga_2O_3$ is 0.08 to 0.23 g./l.

In order to recover gallim from the circulating aluminate solution having such a composition, there have been so far available the following two processes, and their outlines are given below:

(A) Method for directly electro-depositing gallium onto a cathode metal plate:

It has been heretofore considered that it is impossible to carry out electrodeposition by using the circulating aluminate solution as an electrolyte as it is on the following two grounds: (a) aluminum is too excessive in the solution, as compared with gallium, and (b) the gallium concentration of the solution is too low. Thus, when the solution is used as an electrolyte, the composition of the solution must be changed to prepare an electrolyte which can meet the electrodeposition conditions. That is, as the measures for (a), it is necessary to adjust the molar ratio of Ga:Al of about 1:2000 in the circulating aluminate solution to a range of 1:100 to 1:25 by reducing only the amount of aluminum so that the gallium may not be lost. For this purpose, most of the aluminum is removed as precipitate by adding $Ca(OH)_2$ to the solution according to the conventional method, but about 10% of gallium is lost as coprecipitate at that time.

As the measures for (b), research reveals that it is impossible to electrodeposit gallium unless at least 0.3 g./l. of gallium is present in the electrolyte and to carry out the electrodeposition economically, it is necessary that gallium is at least 2.3 g./l. However, the gallium concentration in the circulating aluminate solution is in a range of 0.08 to 0.23 g./l., as explained above, and thus the solution, which has been subjected to the measures (a), cannot be utilized as an electrolyte as it is, and the gallium concentration must be increased to at least about 20 times. For this purpose, $CO_2$ is injected into the solution to precipitate gallium and aluminum as coprecipitate so that the gallium may be preferentially precipitated, and the coprecipitate containing about 1% of $Ga_2O_3$ is separated according to conventional method. The coprecipitates are heated and then dissolved again into a NaOH solution to prepare an electrolyte suitable for recovering gallium, and gallium is obtained by electrolysis of this electrolyte.

According to said conventional method, the composition of the circulating aluminate solution is considerably changed, and such method is applicable to only the case that gallium is recovered from a solution rejected in the alumina production for some reason, and thus cannot be applied to the circulating aluminate solution as it is, without hindering the process for producing alumina.

(B) Method for depositing gallium and making an amalgam thereof by using mercury as a cathode:

According to this method, the circulating aluminate solution itself is utilized as an electrolyte for recovering gallium and only gallium and other impurity metallic elements are reduced in the solution by electrolysis. Thus, the solution can be recycled and used for the production of alumina after the electrolysis without any trouble. That is, when the circulating aluminate solution is electrolyzed by using mercury as a cathode, gallium dissolves into mercury 400 times as much as aluminum, because there are differences in solubility of the desposited metal in mercury, that is, the solubility of aluminum at the ordinary temperature is only 0.003%, as compared with 1.3% for that of gallium. Thus, said trouble (A)–(a) can be evaded. Further, the amalgamation of sodium can be controlled by adjusting the liquid temperature, cathode current density, etc. Further, as for (A)–(b), such trouble can be evaded by stirring the upper part of mercury so that the gallium deposited on the surface of mercury and amalgamated may be diffused rapidly into the inside of the mercury. When the gallium in the mercury reaches 1% by weight, such gallium amalgam is transferred to other vessel, where the amalgam is treated with a caustic soda solution to form a solution of sodium and gallate. Gallium is recovered from this electrolyte by the second electrolysis.

According to said method, when 2000 tons of ores containing 0.002% of gallium is treated in a day, it is calculated that 640 m.$^2$ of mercury cathode surface is required for recovering all the gallium in the case of the first electrolysis using the circulating aluminate solution. Thus, a large amount of expensive mercury must be used for the treatment. Further, there is a difficulty in agitation over the entire surface of mercury while preventing the mercury from dissipation at the electrolysis.

However, according to the knowledge obtained by the present inventor experimentally, said trouble (A)–(a), that is, the requirement that the molar ratio of Ga:Al must be at least 1:100, and said trouble (A)–(b), that is, the requirement that the gallium concentration must be at least 0.3 g./l., are of no consideration. Further, it is found that the ordinary metal plate can be used in place of the expensive troublesome mercury and gallium can be recovered by direct electrodeposition, using the circulating aluminate solution as an electrolyte as it is. That is, even if the molar ratio of Ga:Al is 1:120,000 or even if the gallium concentration is as diluted as 1 p.p.m., it is possible to sufficiently electrodeposit gallium under such conditions. In general, the fact that gallium cannot be directly electrodeposited from the circulating aluminate solution itself is not due to the said causes of (A)–(a) and (A)–(b), but rather the fact that there are hinderances or impediments for the electrodeposition in the solution is important. If there are such hinderances, it is possible to electrodeposit gallium only by eliminating them. However, if there are no hinderances in the solution, it is possible to electrodeposit gallium, using the solution as an electrolyte as it is. The present inventor filed Japanese patent applications "A Method for Electroplating Gallium" and "A Method for Plating Gallium or Gallium Alloys Based on Cell Constitution Without External Power Supply." According to one of these methods, an electroplating solution containing gallium in several p.p.m. order is prepared from a strong alkaline solution containing $Al(OH)_3$ dissolved in a concentrated state, and a semi-conductor, or a metal to be plated is placed therein as a cathode so as to face or contact the aluminum anode, whereby a cell is constituted, or aluminum, stainless steel, carbon or the like is used as an anode, and by passing a direct current through the anode and cathode gallium or gallium alloy is electroplated onto a material to be plated.

On the other hand, the circulating aluminate solution in the Bayer process for producing alumina meets the conditions for said gallium plating bath with respect to its components and composition. Thus, it is possible to directly electrodeposit gallium onto a suitable metal plate from the circulating aluminate solution according to said electroplating method, and thus it is possible thereby to recover gallium. However, it is found that the reason that in the most cases, gallium is not electrodeposited when the circulating aluminate solution is used as an electrolyte as it is, is that the electrolyte usually used in the ordinary electrolytic refining or electroplating contains very small amounts of impurities where as the circulating aluminate solution contains very small amounts of gallium and a relatively large amount of other substances, and thus there is a larger possibility of the presence of obstacles for impeding the electrodeposition. Thus, in such a case, it is possible to electrodeposit gallium onto a suitable metal plate if such obstacles are eliminated, and it is possible to recover gallium therefrom.

The present invention is hereunder explained in detail as regards two cases, that is, (A) a method for directly electrodepositing gallium onto a cathode plate from the circulating aluminate solution in the case that there are no obstacles, and (B) a method for eliminating the obstacles in the case that there are obstacles, with reference to examples and also in view of the actual cases.

(A) A method for directly electrodepositing gallium onto a cathode plate from the circulating aluminuate solution in the case that there are no obstacles.

(1) Electrolyte: As explained above, the composition of principal components of the circulating aluminate solution after the removal of $Al(OH)_3$ by precipitation when the solution reaches the stationary state is 130–200 g./l. of NaOH, 65–130 g./l. of $Al(OH)_3$, 0.08–0.23 g./l. of $Ga_2O_3$ and a very small amount of $Na_2CO_3$, $SiO_2$, Cl, $SO_3$, $P_2O_5$, $V_2O_5$, $AS_2O_3$, $MoO_3$ and others as impurities. The solution having such a composition is returned to the initial step of the process for producing alumina to dissolve soluble components in the ores freshly charged there and then $Al(OH)_3$ settles down as precipitate, as explained above. Actually, a solution in an amount as much as several thousand tons is circulated according to the steps. Gallium is supplied from the newly charged ores during the circulation, but some portion of gallium is dissipated on said grounds and removed from the circulating aluminate solution. The amount of gallium to be dissipated is increased at higher gallium concentration. However, if the gallium concentration of the solution is too low, the efficiency of gallium electrodeposition is lowered. Thus, the too low gallium concentration is not advantageous for recovering the gallium. Thus, the concentration of a solution for effecting electrodeposition to recover gallium is suitably adjusted and it is not necessary to recover all the gallium contained in the solution. In other words, when a desired amount of gallium is recovered, the remaining gallium is again circulated in a highly concentrated state together with the gallium in the freshly charged ores. To smoothly make such adjustment, there is available a method which comprises providing a by-pass at a main pipe in addition to provision of a recovery apparatus in the course of the main pipe for the circulating aluminate solution, adjusting the amount of the solution to be entered into the by-pass and passing a predetermined amount of the solution always through the main pipe by providing the recovery apparatus, and a method which comprises providing several courses provided with gallium recovery apparatuses and intermittently passing the solution therethrough. In the recovery apparatus, the temperature of the circulating aluminate solution serving as an electrolyte is adjusted to a temperature suitable for keeping the precipitation of $Al(OH)_3$ to a minimum and the efficiency of the gallium electrodeposition to a maximum.

(2) Anode: As an insoluble anode in the case that a direct current is passed, a carbon or nickel or stainless steel anode, which is electrochemically insoluble in the alkaline solution, is used. In the case of soluble anode, only aluminum is used practically, because even if aluminum is dissolved, it becomes an effective component in the circulating aluminate solution and will not serve as an obstacle for the process for producing alumina. However, when a large amount of aluminum is dissolved, the anode becomes economically disadvantageous, and the precipitates of $Al(OH)_3$ are occasionally formed. Thus, there is a fear of impeding the process for smoothly producing alumina. Accordingly, it is necessary to repress the dissolution of anode aluminum approximately to an electrochemically necessary amount. When the precipitates of $Al(OH)_3$ are formed, a device is made to utilize such effective component and to recover the gallium without trouble.

(3) Cathode: The cathode is generally immersed in circulating aluminate solution for a long period of time, and thus such metals that undergo no chemical corrosion by the solution but facilitate the gallium deposition as by iron, lead and copper are used. Particularly in the case of cell constitution, aluminum is used as an anode and as a cathode, copper, lead or others having a small ionization tendency is effective to increase a single electrode potential. The state of electrodepositing surface is not necessarily taken into account especially, different from the electroplating. Further, the temperature of the circulating aluminate solution is above the melting point of gallium in the most cases, the excessively electrodeposited gallium flows down along the cathode surface in a molten state and is retained in an electrolysis cell or the bottom part of the cathode itself in the recovery apparatus. Accordingly, when more than the predetermined amount of the molten gallium is retained, it is preferable to recover it by flowing the molten gallium to the outside of the electrolysis cell. Thus, the shape of the cathode and the form of the electrolysis cell must be designed to meet said purpose.

(4) Procedures for constituting a cell and for passing a direct current: As a procedure for constituting a cell there are available a contact type which makes the cathode metal simply contact the anode aluminum and a counter-placed type which counterplaces both electrodes and connect them with a lead material. In any of these types, the anode aluminum is dissolved and consumed and thus a device is made to make the anode aluminum move downwards automatically for continuous use so that the anode may be made up according to its consumption. According to an experimental example of the counter-placed type, a current of 400 to 600 ma. almost always passes between both electrodes. When an aluminum rod is used as an anode and a copper plate is used as a cathode, it is found that the amount of gallium to be deposited is almost in proportion to a logarithm of cathode surface area. Accordingly, it is desirable in that case to use a large number of sets of relatively small cathode and anode. In the case of the procedure for passing a direct current, the efficiency is higher, if the cathode current density is relatively large. Actually, a range of 10 to 50 a./dm.$^2$ is suitable. Generally, in the case that the gallium concentration of the circulating aluminate solution, that is, the electrolyte is low, for example, 0.02% or less, the procedure for constituting a cell is effective, but in the case of a high concentration, the procedure for passing a direct current is high in efficiency.

(5) Electrodeposits: As explained above, a large amount of gallium is deposited onto the cathode surface, flows down in a molten state, is retained in the bottom and is made to flow to the outside of the electrolysis cell naturally. This is the most preferable procedure to collect gallium deposit, but it is very simple to take the cathode out of the cell and to peel the deposited gallium physically or chemically from the cathode surface according to circumstances. In addition, if the gallium can be electrodeposited in an alloy form with other metal or impurities, or the gallium can be deposited onto the cathode surface in a state of oxide or lower oxide of gallium, the refining of gallium from alloy or compound having a high gallium content can be relatively readily effected, so long as the gallium contained in a very small amount in the solution can be collected on the cathode surface in any form.

(6) Examples: For experimental purpose, $Al(OH)_3$ is used as the aluminum-NaOH as the alkali- and $Ga_2O_3$ as the gallium-component. At first, three kinds of alkali mother liquor and a gallium solution as described below are prepared and the electrolytes are prepared by suitably mixing these solutions and used in the experiments:

Alkali mother liquor: As the NaOH concentration and $Al(OH)_3$ concentration of the circulating aluminate solution are 130–200 g./l. and 65–130 g./l. respectively as explained above, the experimentally highest NaOH concentration is set to be 190 g./l., and $Al(OH)_3$ is gradually added to the solution approximately to the saturation, whereby the same $Al(OH)_3$ concentration of 190 g./l. is obtained. Then, the following three alkali mother liquors having different concentration are prepared. That is, a mother liquor (a) containing 130 g./l. each of NaOH and $Al(OH)_3$; a mother liquor (b) containing 160 g./l. each of NaOH and $Al(OH)_3$; and a mother liquor (c) containing 190 g./l. each of NaOH and $Al(OH)_3$.

A gallium solution: When $Ga_2O_3$ is not easily soluble in a strong alkaline solution, $KHSO_4$ in an amount ten times as much as $Ga_2O_3$ is added to $Ga_2O_3$ and fused and cooled. Then, it is dissolved in 5% $Na_2SO_4$ in an amount about ten times as much. When $Ga_2O_3$ is soluble in a strong alkaline solution, it is dissolved in 50% NaOH in an amount about 10 times as much. In any case, the gallium solution is prepared so that 1 g. of $Ga_2O_3$ may take a total volume of 107 cc. By so doing, 1 cc. of the gallium solution contains 0.0001 mole that is, 7 mg., of metallic gallium. The specific gravity of said alkali mother liquor is about 1.25. For example, by adding 1 cc. of the gallium solution to 1 l. of the mother liquor, the gallium concentration of the solution becomes about 5.6 p.p.m.

EXAMPLE 1

The electrolyte is prepared by adding 30 cc. of the gallium solution to 970 cc. of the mother liquor (b) (Ga concentration: 167 p.p.m.) and placed in a 1-l. beaker. A counter-placed type cell is prepared by immersing a 5.0 mm. $\phi$ Al rod into the solution to a depth of about 100 mm. as an anode. The Al rod is made to automatically move downwards according to the consumption of the rod and immersing a 0.2 mm.-thick copper plate in a form of equilateral triangle having a bottom side of 50 mm. and a height of 100 mm. as a cathode into the solution to a depth of about 80 mm. with the apex down. Both cathode and anode are connected with a lead wire and an ammeter is inserted therebetween. The bath temperature is about 60° C. and the current is 450 to 550 ma. After the immersion for 30 minutes, a bright, silver-white electrodeposit is obtained on the entire surface. The surface is in a finely granular, irregular state, and the portion in contact with the liquid surface is in a molten and slightly swollen state similar to mercury. Small spherical aggregates of deposits exist at several locations, that is at the portion where the lower apex of the triangle is a little wound up and at other portions. The weight of the electrodeposits (which will be referred to hereinafter as "W") is 107 mg., which is about half of the weight of the gallium contained in the solution.

EXAMPLE 2

The electrolyte is prepared by adding 10 cc. of the gallium solution to 990 cc. of the mother liquor (a) (Ga: 56 p.p.m.) and placed in a 1-l. beaker. A contact-type cell construction is prepared. The cathode is a 50 x 50 x 0.2 mm. copper plate, and a hole of a diameter of 3.5 mm. $\phi$ is provided at the center on one side thereof and a 3.5 m. $\phi$ Al anode is passed through the hole and fixed by bending its end. The cathode is immersed into the solution so that the upper end may locate horizontally at about 30 mm. below the liquid level. A silver-white electrodeposits can be obtained on the entire surface at a bath temperature of 70° C. for an immersion time of 15 minutes. $W = 17.3$ mg.

EXAMPLE 3

The electrolyte is prepared by adding the gallium solution to the mother liquor (c), placed into a 1-l. beaker and is subjected to electrolysis by passing a direct current therethrough.

(i) Soluble anode: 50 cc. of the gallium solution is added to 950 cc. of the mother liquor (c) (Ga: 280 p.p.m.). A 5 mm. $\phi$ Al rod is immersed into the solution to a depth of 100 mm. as an anode and an iron plate of 50 x 100 x 1.0 mm. is immersed into the solution to a depth of 80 mm. as a cathode. A current is passed at about 3.0 v. and about 20 a. for 30 min. at a bath temperature of 80° C., whereby a silver-white, finely granular electrodeposits having an irregular surface and a large number of small spherical molten masses adhered to the circumference of the cathode is obtained. $W = 207$ mg. (which is about 60% of Ga added).

(ii) Insoluble anode: 30 cc. of gallium solution is added to the mother liquor (c), and a 10 mm. $\phi$ carbon rod is immersed into the solution to a depth of 100 mm. as an anode, and a lead plate of 50 x 100 x 200 mm. is immersed into the solution to a depth of 80 mm. as a cathode. A current is passed at about 3.0 v. and about 20 a. for 30 min. at a bath temperature of 85° C., whereby a cloudy silver electrodeposit having dark black patterns and small spherical projections spotwise at the circumference of the cathode is obtained.

(B) Method for eliminating obstacles, when there exist obstacles:

In addition to 0.08 to 0.23 g./l. of $Ga_2O_3$, the circulating aluminate solution contains such other impurities as 17.0 g./l. of $Na_2CO_3$, 0.3 g./l. of $SiO_2$, 05 g./l. of Cl, 0.15 g./l. of $SO_3$, 0.8 g./l. of $P_2O_5$, 0.5 g./l. of $V_2O_5$ and a certain amount of $As_2O_3$, and sometimes it is necessary to take into account also $MoO_3$. Accordingly, the unobvious amount of $As_2O_3$ and $MoO_3$ are assumed to be 0.3 g./l. for both. When there are no impurities such as $Na_2CO_3$ and others, the good electrodeposit of gallium can be obtained, as is clear from the experiment in the case of (A), but when there are such amounts of impurities, no gallium is electrodeposited at all even by carrying out the experiment similar to the case (A). Accordingly, it is considered that there are involved obstacles for impeding the gallium deposition in these impurities and thus the following experiment is carried out:

A fundamental solution prepared by adding 15 cc. of the gallium solution of 1 l. of said mother liquor (b), that is, a liquor containing 160 g./l. of NaOH, 160 g./l. of $Al(OH)_3$ and 0.14 g./l. of $Ga_2O_3$, is thereby prepared. To said fundamental solutions are added separately 17.0 g./l. of $Na_2CO_3$, $Na_2SiO_3$ (0.3 g./l. in form of $SiO_2$), which will be hereinafter referred to as "$SiO_2$—0.3," NaCl (Cl—0.5), $H_2SO_4$ ($SO_3$—0.15), $Na_2P_4O_7 \cdot 10H_2O$ ($P_2O_5$—0.8), 0.5 g./l. of $V_2O_5$, 0.3 g./l. of $As_2O_3$ and

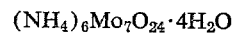

$(NH_4)_6Mo_7O_{24} \cdot 4H_2O$ ($MoO_3$—0.3) to prepare test solutions containing one of these components. Experiment is carried out under the same conditions as in said (A)—Example 1, and as a result no gallium electrodeposit is obtained in the test solution containing $V_2O_5$. In other test solutions, good gallium electrodeposit can be always obtained. However, in the test solution containing $MoO_3$, an alloy of gallium-molybdenum can be electrodeposited. As a result of these experiments, it is newly found that the presence of $V_2O_5$ principally impedes the gallium electrodeposition.

Thus, to all other test solutions than the solution containing $V_2O_5$ used in said experiment are added 0.5 g./l. of $V_2O_5$, and similar tests are carried out using these test solutions. No gallium electrodeposits are obtained at all from the test solutions containing $V_2O_5$, whereas good gallium electrodeposits are obtained from the test solutions containing no $V_2O_5$.

Then, similar experiment is carried out using a test solution prepared by adding said predetermined amounts of other impurities than $V_2O_5$ to the fundamental solution (that is, a synthetic circulating aluminate solution containing no $V_2O_5$), and good gallium electrodeposits can be obtained. Further, similar experiment is carried out using a test solution prepared by adding 0.5 g./l. of $V_2O_5$ to said test solution (that is, a synthetic, circulating aluminate solution), and no gallium electrodeposit can be obtained at all as in the first experiment.

It is found from the result of the foregoing experiments that gallium is not electrodeposited at all from the solution containing 0.5 g./l. of $V_2O_5$, that is, $V_2O_5$ among the impurities obviously impedes the electrodeposition of gallium.

In the circulating aluminate solution in the process for producing alumina, organic matters beside said impurities are contained. Further, a very small amount of Fe, Cu, etc. is also contained. These substances impedes the electrodeposition of gallium to some extent, but it is found that the impediment of $V_2O_5$ is most remarkable among these substances. Procedures for eliminating the influences of impurities which impede the electrodeposition of gallium will be hereunder explained.

(1) Removal of organic matters: The bauxite is often calcined as one of the preliminary treatments before the bauxite is dissolved into the caustic soda solution in the autoclave. The organic matters in the circulating aluminate solution all come from the organic substances contained in the ores, and thus they will not come into the solution when the ores are calcined in advance, but they will come into the solution, when no calcination is carried out. Even if other obstacles are removed from the circulating aluminate solution which has been obtained from bauxite having had no calcinating treatment according to the procedure which will be explained later, it is found very difficult to electrodeposit gallium. Thus, the presence of such organic matters are obviously an obstacle. It seems that it is most economical and effective to carry out calcination of bauxite as a preliminary treatment to remove organic matters. But when the organic matters are contained in the circulating aluminate solution owing to omitting of such preliminary treatment, about 1 g. of activated carbon is added to the solution per 1. of the solution, though the amount of activated carbon depends upon the content of organic matter, and after a sufficient shaking and leaving the solution for some time, by filtration the organic matters can be eliminated from the solution to such a degree that the solution can be applied to the electrodeposition of gallium without any trouble.

(2) Removal of Fe and Cu: A very small amount of Fe and Cu compounds is contained in the circulating aluminate solution, and impedes the electrodeposition of gallium to some degree. However, these Fe and Cu compounds can be settled down as black, insoluble precipitates by adding a reducing agent, $Na_2S_2O_4$ to the solution or by adding metallic aluminum to the solution, according to the methods for removing a vanadium compound, which will be explained below, and then the precipitates can be removed by filtration.

(3) Removal of vanadium: Vanadium is dissolved in the circulating aluminate solution in the form of penta-valent vanadic acid, but when at least about 0.1 g. of vanadium is contained in 1 l. of the solution in form of $V_2O_5$, it is very difficult to electrodeposit gallium. When at least 0.3 g. of vanadium as $V_2O_5$ is contained in the solution, it is very difficult to obtain gallium electrodeposits according to either the cell-constituting method or direct current-passing method.

When vanadium is present in the circulating aluminate solution in the form of penta-valent vanadic acid, the current is wasted only for reduction of vanadium at the cathode and oxidation thereof at the anode during the electrolysis, and the electrodeposits of such metals as gallium, vanadium, or the like cannot be obtained. This fact is obvious from the effected experiment and the presence of vanadium in the circulating aluminate solution obviously impedes the electrodeposition of gallium.

To eliminate such an impediment, there are available two methods, that is, (a) a method for shielding either anode or cathode or both so that no repeated reduction and oxidation of vanadium may be effected at the electrodes, by enclosing either anode or cathode or both with diaphragms or inserting an isolating wall between the electrodes and (b) a method for removing precipitates obtained by converting the vanadium compound to an insoluble compound by a chemical treatment such as reduction, etc. or by an electrochemical procedure. These methods will be explained hereunder with reference to examples.

(a) Method for isolating both electrodes with diaphragms:

A gallium electrodeposit having a metallic gloss can be obtained, though not efficiently, by enveloping the anode with an alkali-resistant bag of synthetic fibers, and applying to the direct current-passing method. When the anode and the cathode are enveloped with said bags, the electrodeposition of gallium is much improved. When an electrolysis cell in which the tight isolation is ensured by providing a biscuit plate between these two electrodes is used, gallium can be more effectively electrodeposited.

Example.—A synthetic circulating aluminate solution is used as an electrolyte. A copper plate cathode (50 x 100 mm.) provided with a diaphragm is immersed into the solution to a depth of 70 mm., and a stainless steel anode (50 x 100 mm.) provided with a diaphragm is immersed into the solution to a depth of 70 mm. A current is passed under a voltage of about 5 v. and about 4 a. through about 1.7 l. of electrolyte at a inter-electrode distance of 120 mm. for one hour, whereby an electrodeposit having a metallic gloss can be obtained (weight: about 7 mg.). It is found as a result of analysis by a microanalyzer that vanadium and molybdenum are contained besides the gallium.

According to some literature, vanadium at first and gallium then are electrodeposited in an electrolyte containing both gallium and vanadium, and thus it seems that a relatively thick gallium electrodeposit can be obtained over a substantial period of time, but in any case vanadium and molybdenum are deposited and contained in the electrodeposits. On the other hand, in the cell-constituting method no effect is observed even when such a diaphragm is used.

(b) Method for removing vanadium by converting it to an insoluble compound:

There are $V_2O_5$, $V_2O_4$, $V_2O_3$, VO and $V_2O$ as oxides of vanadium, and among them VO and $V_2O$ are not usually formed in a simple manner. Among the remaining vanadium oxides, $V_2O_5$ and $V_2O_4$ are soluble and only $V_2O_3$ is insoluble in alkaline solution. Thus, it is most effective to eliminate vanadate salts, that is, pentavalent compounds contained in the circulating aluminate solution by reducing it to $V_2O_3$ according to some method and removing the alkali-insoluble precipitates by filtration or other method. As the method for such reduction there are two methods, that is, based on (i) addition of a reducing agent and (ii) use of nascent hydrogen.

(i) Method based on the addition of a reducing agent: $Na_2S_2O_4$ is most effective as a reducing agent in alkaline solution. Said compound functions well at a higher temperature. Thus, the solution temperature is kept at 60 to 80° C., about 3 g. of $Na_2S_2O_4$ is added to 1 l. of a synthetic circulating aluminate solution and agitated, whereby dark brown precipitates are formed. By leaving the precipitates to be naturally cooled, the color is gradually changed to black. As a result of carrying out experiments of the test solution, from which such precipitates have been removed by filtration, according to the cell-constituting method and the direct current-passing method, the silver-colored electrodeposits having a metallic gloss can be obtained by any of these methods.

Example.—(1) Contact-type, cell-constituting method: 500 cc. of said test solutions is used, and a 3 mm. $\phi$ aluminum rod is made to come in contact with a copper plate cathode (50 x 50 mm.) By immersing it into the solution to a depth of 70 mm. for one hour, 3 mg. of gallium electrodeposits can be obtained.

(2) Direct current-passing method: 1 l. of said test solution is used. A copper plate cathode (50 x 100 mm.) and a stainless steel anode (50 x 100 mm.) each were immersed into the solution to a depth of 80 mm. at an inter-electrode distance of 100 mm., and a current is passed under a voltage of 4 v. and 4 a. for one hour, whereby 12 mg. of electrodeposit having a metallic gloss is obtained. Any of the electro-deposits contains gallium as its principal component, and contains vanadium and molybdenum other than gallium.

Among the reducing agents, there is such a reducing agent as $NaH_2P_2O_2$ that is not so powerful to remove vanadium but gives a good influence upon the electrodeposition of gallium if it exists in the solution.

(ii) Method based on the use of nascent hydrogen: When hydrogen gas is used for reduction, no effect is obtained even by using a nickel catalyst when a hydrogen gas is simply injected into the solution. Thus, the nascent hydrogen is made to be generated in the solution and utilized. To generate hydrogen gas in the solution, there are available two methods:

($\alpha$) Method for adding a metal capable of generating hydrogen through the dissolution thereof in alkaline solution. The metal that meets such conditions and is available at a low cost and is safe and ready to handle is zinc and aluminum. However, when zinc is dissolved, it is retained in the solution as more readily electrodepositable impurity than gallium. Thus, zinc can reduce vanadium but gallium cannot be electrodeposited from the solution almost at all, and rather zinc is electrodeposited. Thus, zinc is not suitable for the desired recovery of gallium. On the other hand, aluminum meets the purpose very well and can reduce the vanadium and at the same time is very effective for the electrodeposition of gallium without any impediment to the process for producing alumina. Further, there is such an advantage that impurity metals having considerably lower ionization tendency than that of aluminum can be also precipitated as fine metallic powder and removed at the same time as vanadium is reduced by aluminum. Furthermore, aluminum, whose specific gravity is small, is trivalent, and thus three hydrogen atoms are liberated from one aluminum atom. The granular powders move vigorously through the solution together with the generation of hydrogen and completely dissolve into the solution for a relatively short period of time (about 10 to 20 minutes). Thus, aluminum has a very good reducing effect, though the weight is relatively small. Furthermore, it is convenient, because Mo, which has not been reduced by the reducing agent, $Na_2S_2O_4$, can be also well reduced by aluminum. Experimental example is given below:

When 2.5 g. of granular powders of aluminum is added to 1 l. of a synthetic aluminate solution at the ordinary temperature, the entire solution turns to blackish grey immediately. When the solution is filtered by means of a filter paper, the clear filtrate can be obtained, and black precipitates are obtained as a residue. By drying the precipitates, the precipitates turn to dark yellowish brown and are obviously identified to be oxides of vanadium and molybdenum. When the amount of aluminum granular powders is increased to 5 to 10 g./l., gallium may coprecipitate to some extent, but even in that case, it is relatively easy to separate gallium from the precipitates. Thus, a method for generating hydrogen by adding metallic aluminum to the solution is very advantageous.

($\beta$) Method based on utilization of hydrogen generated by electrolysis of water: When the synthetic circulating aluminate solution is subjected to electrolysis, Al is incapable of undergoing electrodeposition and only a very small amount of impurities such as gallium is electrodepositable. Thus, almost all the electric power is consumed by the electrolysis of water, and a large amount of hydrogen is generated at the cathode. Accordingly, the hydrogen can be made to come in contact with pentavalent vanadium as much as possible in a nascent state. For this purpose, a hydrogen overvoltage at the contact surface between the cathode and electrolyte may be increased. The substance having the largest hydrogen overvoltage is mercury, and a method for enveloping the cathode surface with the mercury is conceivable. For example, the copper plate may be immersed into a solution of mercury salt such as $HgSO_4$ to electroplate the surface by replacement. When a copper plate is immersed into an about 3% $HgSO_4$ solution for one minute, about 30 mg./dm.$^2$ of mercury is deposited to cover the surface. The copper plate electroplated with mercury in such a manner is used as a cathode. The area of cathode is made as large as possible, and the cathode is placed horizontally on a lower level and a nickel anode enveloped with a diaphragm is placed on an upper level. Electrolysis is conducted at a cathode current density of about 0.5 a./dm.$^2$ and an anode current density of about 30 to 50 a./dm.$^2$ under a voltage of 4 v., while agitating the electrolyte, whereby $V_2O_3$ is precipitated on the cathode surface as black powder or settles down in the neighbor to the cathode. The precipitates which settled down are filtered off and $V_2O_3$ may be separated. The $V_2O_3$ precipitated on the cathode surface may be water washed and removed. The portion which is incapable of being removed thereby is left to stand in air as it is, whereby $V_2O_3$ is oxidized to $V_2O_5$. This compound is soluble in alkali and is washed out with an alkaline solution. The thus purified cathode can be used repeatedly. According to said method, a sufficiently large amount of nascent hydrogen can be effectively utilized by increasing the cathode area, decreasing the cathode current density and passing a large amount of current therethrough, and vanadium can be efficiently removed.

When a reducing agent such as $Na_2S_2O_4$ is added to the solution and electrolysis is carried out, $V_2O_3$ can be more effectively formed. From the solution in which vanadium is reduced according to said method, a good gallium electrodeposits can be obtained by the cell-constituting method or direct current-passing method without using any diaphragm.

In the foregoing, various methods for eliminating obstacles for the electrodeposition have been described respectively. When there are various obstacles in the circulating aluminate solution, these obstacles are eliminated at first according to the following method. That is, when a considerable amount of organic matters is contained in the circulating aluminate solution, the organic matters are removed by activated carbon. Then, the filtrate is heated to 60 to 80° C., is added with a reducing agent, $Na_2S_2O_4$ to the filtrate and is left for some time after a thorough agitation. Or several grams of granular aluminum powder is added to 1 l. of the solution at the ordinary temperature and shaked, whereby vanadium, molybdenum, iron, copper, etc. are allowed to precipitate and removed by filtration if necessary. In the necessary case, a nickel anode isolated by a diaphragm and a copper plate cathode plated with mercury are immersed into the filtrate, and then electrolysis is conducted. The remaining vanadium is precipitated as $V_2O_3$ and filtered. The thus obtained solution is used as an electrolyte.

The entire amount of the precipitates formed by addition of $Na_2SO_4$, addition of granular aluminum powders, and the reduction by the electrolysis is in order of several grams per 1 l. of the electrolyte. No sodium, aluminum and gallium are contained almost at all in the precipitates. Accordingly, the obstacles for impeding the electrodeposition can be eliminated through said operations from the circulating aluminate solution without changing the concentrations of aluminum and sodium as principal component of the solution and the concentration of desired gallium to be recovered. From this solution gallium can be directly electrodeposited and recovered advantageously without impeding the process for producing alumina according to the cell-constituting method or direct current-passing method as described before in (A) a method for directly electrodepositing gallium onto a cathode plate from the circulating aluminate solution in the case that there are no obstacles.

Example.—Electrodeposition experiments are carried out with a gallium electrolyte obtained by applying said operations for eliminating obstacles to the circulating aluminate solution practically used (containing 210 g./e. of $Na(OH)_3$, 110 g./l. of $Al(OH)_3$, 0.12 g./l. of $Ga_2O_3$ and other impurities such as Si, V, Mo, Ca, K, Fe . . .) in the process for producing alumina.

(i) Counter-placed type, cell-constituting method: 500 cc. of an electrolyte is placed into a beaker and a copper plate cathode (50 x 100 mm.) is immersed into the solution to a depth of 70 mm., and a 3 mm. φ aluminum rod anode is immersed into the solution to a depth of 90 mm. The cathode and the anode are connected to each other with a lead wire, and then a current of about 0.23 a. passes spontaneously. According to such cell-constitution a silver-colored gallium electrodeposit having a metallic gloss can be obtained after 2 hours and the weight is 6.0 mg.

(ii) Direct current-passing method: 1.3 l. of the electrolyte is placed into a square vat, and a copper plate cathode (50 x 100 mm.) is immersed into the solution to a depth of 80 mm. and a stainless steel anode (50 x 100 mm.) is immersed into the solution to a depth of 40 mm. so as to face the cathode. As a result of electrolysis at about 4 v. and 4 a. for 2 hours without any agitation, a cloudy silver-colored gallium electrodeposit having a metallic gloss can be obtained. The weight is about 19.0 mg.

I claim:

1. A method which comprises extracting gallium from an aqueous alkali metal aluminate solution containing impurities comprising soluble vanadium ions in an amount sufficient to prevent electrodeposition of said gallium, said gallium being present in a concentration of less than about 0.3 gram per liter, substantially eliminating said impurities comprising soluble vanadium ions in said aluminate solution to obtain an aluminate solution substantially free of impurities comprising soluble vanadium ions, electrolytically depositing said gallium as a metal on a cathode of an electrolytic cell containing said cathode, an anode and, as an electrolyte, said aluminate solution substantially free of impurities comprising soluble vanadium ions.

2. A method according to claim 1 in which an aluminum or an insoluble material is used as an anode, said cathode being an alkali-insoluble metal, said gallium being present in an amount from about 5.7 parts per million to about 170 parts per million.

3. A method according to claim 1 in which said anode is aluminum, said cathode being an alkali-insoluble metal, said metal having a smaller ionization tendency than aluminum, said electrochemical cell being formed by close portioning of the anode with the cathode, and connecting the two with a lead wire or by putting the anode in contact with the cathode.

4. A method according to claim 1 which additionally comprises contacting said aluminate solution, containing impurities comprisng soluble vanadium ions, with activated carbon.

5. A method according to claim 1 in which said impurities comprising soluble vanadium ions are eliminated by the addition of $Na_2S_2O_4$ to said aluminate solution.

6. A method according to claim 1 in which said impurities comprising soluble vanadium ions are eliminated by the addition of metallic aluminum in finely divided form to said solution so as to cause nascent hydrogen and ion-exchange phenomenon.

7. A method according to claim 1 in which said impurities comprising vanadium ions are eliminated by generating nascent hydrogen at the surface of a cathode having a mercury plating thereon.

References Cited
UNITED STATES PATENTS

| | | | |
|---|---|---|---|
| 2,793,179 | 5/1957 | Breteque | 204—105 R |
| 3,170,857 | 2/1965 | Dötzer et al. | 204—105 R |
| 2,598,777 | 6/1952 | Frary | 204—105 R |

OTHER REFERENCES

Hackh's Chemical Dictionary, 4th ed., 1969, p. 221.
Kirk-Othmer Encyclopedia of Chem. Technology, vol. 4, 1964, p. 149.
Modern Electroplating by Lowenheim, 1968, p. 31.
Trans. Electrochem. Soc., 66, 107 (1934), p. 110, by Fogg.

JOHN H. MACK, Primary Examiner
R. L. ANDREWS, Assistant Examiner

UNITED STATES PATENT OFFICE
CERTIFICATE OF CORRECTION

Patent No. 3,677,918                    Dated August 29, 1972

Inventor(s) Shigenobu Miyake

It is certified that error appears in the above-identified patent and that said Letters Patent are hereby corrected as shown below:

Column 3, line 3, "gallim" should read --gallium--.
Column 5, line 16, "(OH)" should read --(OH)$_3$--.

Signed and sealed this 9th day of January 1973.

(SEAL)
Attest:

EDWARD M. FLETCHER, JR.
Attesting Officer

ROBERT GOTTSCHALK
Commissioner of Patents